United States Patent [19]

Frost

[11] 4,360,055

[45] Nov. 23, 1982

[54] HEAT EXCHANGER

[75] Inventor: Donald J. Frost, Racine, Wis.

[73] Assignee: Modine Manufacturing Company, Racine, Wis.

[21] Appl. No.: 721,564

[22] Filed: Sep. 8, 1976

[51] Int. Cl.$^3$ .............................................. F28F 3/12
[52] U.S. Cl. ........................................ 165/38; 165/167
[58] Field of Search ................... 165/157, 166, 167, 38

[56] References Cited
U.S. PATENT DOCUMENTS

| | | | |
|---|---|---|---|
| 2,222,721 | 11/1940 | Ramsaur et al. | 165/165 |
| 2,360,123 | 10/1944 | Gerstung et al. | 165/166 |
| 2,511,084 | 6/1950 | Shaw | 165/157 |
| 2,617,634 | 11/1952 | Jenobassik | 165/167 |
| 3,444,926 | 5/1969 | Stalberg | 165/167 |
| 3,743,011 | 7/1973 | Frost | 165/38 |

Primary Examiner—Samuel Scott
Assistant Examiner—Theophil W. Streule, Jr.
Attorney, Agent, or Firm—Wegner, Stellman, McCord, Wood & Dalton

[57] ABSTRACT

A heat exchanger such as an oil cooler for exchanging heat between two fluids such as coolant water and oil in which the heat exchanger has a tank or casing through which coolant is circulated and containing a stack of heat exchange units each comprising a pair of plates joined together at peripheral edges but spaced apart to provide an oil path defined also by spacer means through the successive internal fluid chambers of the units and a coolant path also defined by spacer means between the units. The spacers between the units comprise sections of the plates making up the units and spacers. The disclosure also includes a bypass valve for bypassing most of the internal fluid chambers in the successive units when fluid such as oil is above a selected viscosity which indicates that much less cooling is required.

4 Claims, 11 Drawing Figures

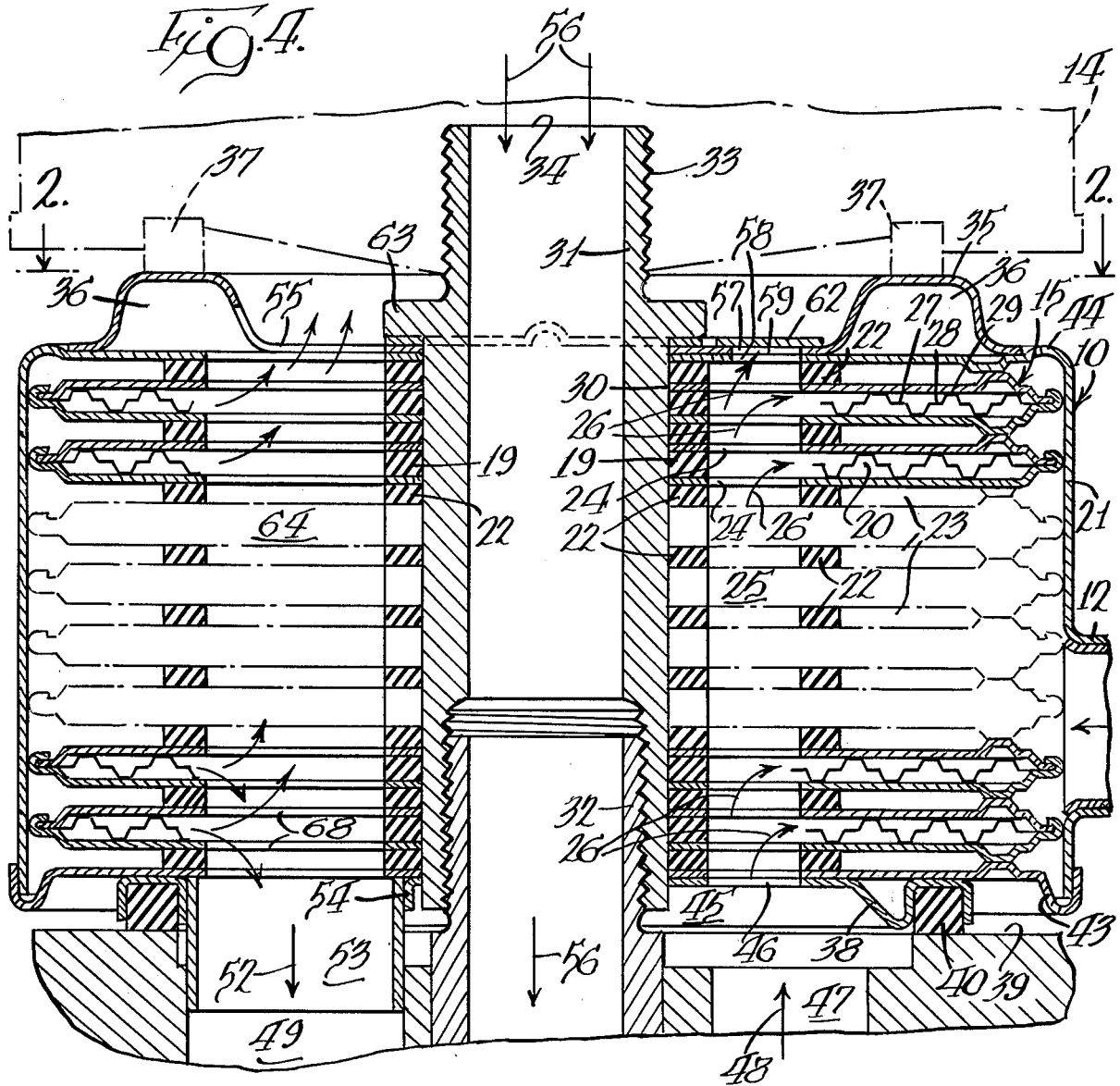
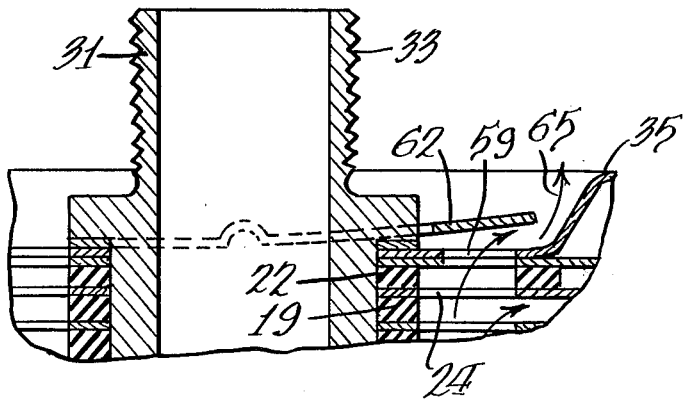

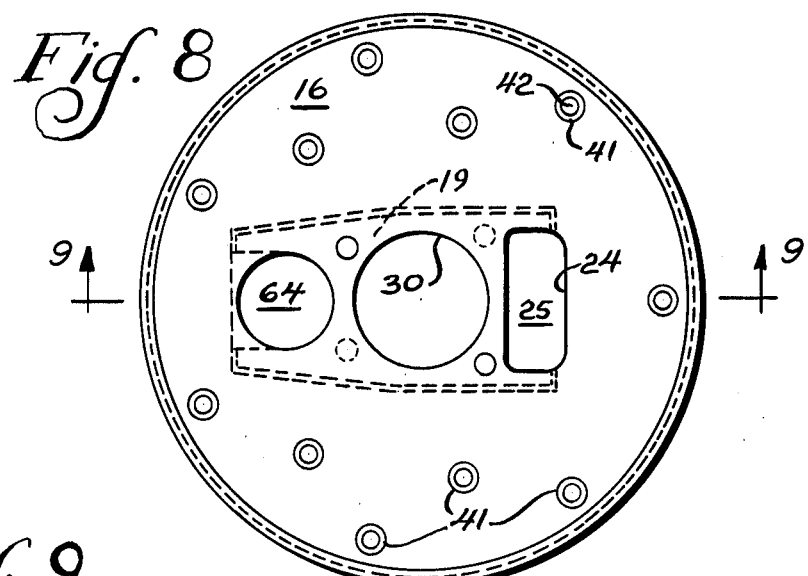
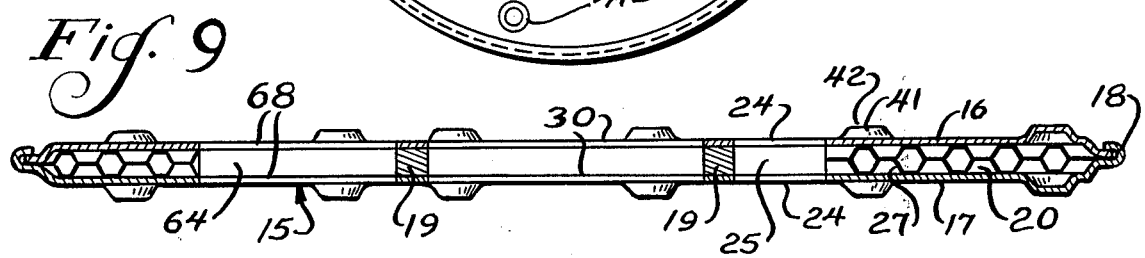
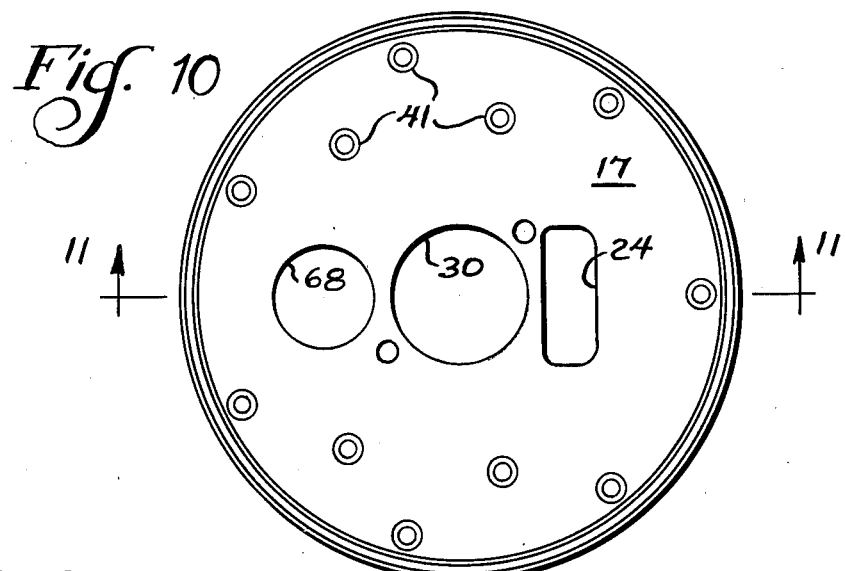
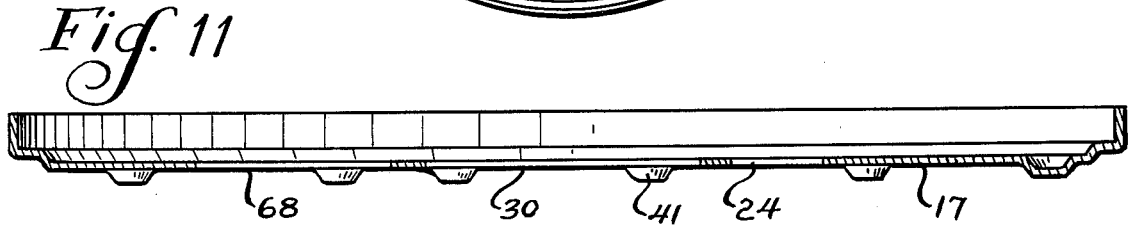

HEAT EXCHANGER

BACKGROUND OF THE INVENTION

One of the features of this invention is to provide an improved heat exchanger that is particularly adapted for cooling lubricating oil in an engine in which the coolant chambers for the two heat exchange fluids are formed by stacked spaced plates in a casing or tank with spacer means for defining the extent of the two sets of chambers with the result that the heat exchanger structure is simple in design, inexpensive to make and readily serviced when requied.

Another feature of the invention is to provide such a heat exchanger with improved valve means that is automatically operated by the high viscosity of one of the fluids such as lubricating oil at a relatively low temperature where cooling is not required so as to bypass much of the cooling capacity of the exchanger.

The most pertinent prior art of which applicant is aware is his own U.S. Pat. No. 3,743,011 which is also a heat exchanger and specifically an oil cooler made up of stacked plates and which also discloses two embodiments of pressure controlled bypass of one of the fluids such as oil. The present invention differs from this in providing certain structural advantages which are disclosed and claimed in the present application.

BRIEF DESCRIPTION OF THE DRAWINGS

FIG. 4 is a longitudinal sectiional view through one embodiment of an oil cooler of the invention and substantially coinciding with the section line 4—4 of FIG. 2 and enlarged for clarity of illustration.

FIG. 5 is a fragmentary view of a portion of FIG. 4 showing the pressure operated valve in open position.

FIG. 8 is a plan view of one of the heat exchange units used in both embodiments of the invention.

FIG. 9 is a sectional view taken substantially along line 9 of FIG. 8.

FIG. 10 is a plan view of one of the pair of plates used in each heat exchange unit.

FIG. 11 is a sectional view taken substantially along line 11—11 of FIG. 10.

DESCRIPTION OF THE PREFERRED EMBODIMENTS

Figure 1:
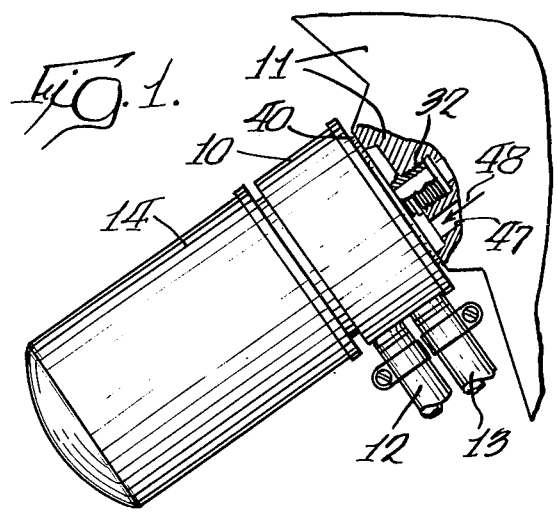
FIG. 1 is a side elevational view partially in section of an engine block having mounted thereon a heat exchanger oil cooler embodying the invention with an oil filter of the customary type in position superimposed on the oil cooler.

In the embodiment of FIGS. 1-5 the heat exchanger 10 is an oil cooler mounted on an engine block 11 and connected to the coolant system of the engine by an inlet hose 12 and an outlet hose 13. In the embodiment of FIG. 1 there is illustrated an oil filter 14 mounted on the heat exchanger 10 in superimposed relationship. For clarity of illustration the filter is shown in broken lines in the two embodiments of FIGS. 4 and 6.

Figure 3:
FIG. 3 is a detail sectional view taken substantially along line 3—3 of FIG. 2.
Figure 6:
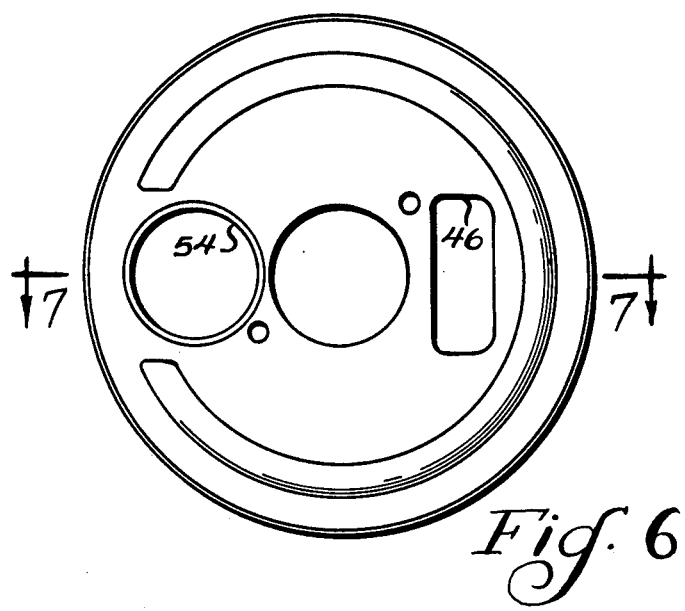
FIG. 6 is a plan view of the bottom gasket plate of the heat exchanger of both embodiments of FIGS. 4 and 6.
Figure 7:
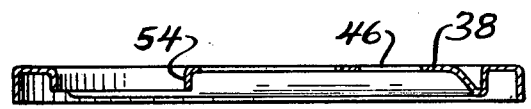
FIG. 7 is a sectional view taken substantially along line 7—7 of FIG. 6.

As illustrated in detail in FIGS. 3-5 the oil cooler comprises a plurality of heat exchange units 15 shown in assembled relationship in FIGS. 4 and 6 and illustrated individually in FIGS. 8 and 9. Each of these heat exchange units comprises a pair of plates 16 and 17 joined together at their peripheral edges as shown at 18 with the plates held in spaced apart position as illustrated in FIG. 11 and provided with first spacers 19 on the interior of each pair of plates 16 and 17 to define with the sealed edges 18 an internal first fluid or oil chamber 20.

The heat exchange units 15 are arranged in a superimposed stack as shown in both embodiments of FIGS. 4 and 6 with each assembly or plurality of heat exchange units being enclosed by a generally cylindrical casing or tank 21.

Within the tank 21 there are provided means including spacers 22 between the units 15 for arranging these units in spaced series to provide a plurality of successive second fluid chambers 23 between the units. In the illustrated embodiments, of course, these chambers 23 are for the liquid coolant flowing from the entrance through the inlet line 12 and from the heat exchanger back to the liquid coolant supply through the outlet line 13.

The pair of plates 15 and 17 comprising the individual heat exchange units 15 are provided with aligned openings 24 which serve as flow openings to provide access to and from the internal oil chambers 20. These openings which are separated from the water chambers by the spacers 22 comprise an oil inlet manifold 25 through which the oil flows and from there laterally into the chambers 20 as illustrated by the arrows 26 in both embodimens of FIGS. 4 and 6.

Within each oil chamber 20 of each unit 15 there is provided a turbulizer 27 to provide agitation to the oil and thus increase the heat transfer between the oil and the liquid coolant. Any type turbulizer desired may be used but the one disclosed is of the type in which the sheet of metal 28 is cut in slits to provide strands alternate ones of which are distorted above and below the middle sheet 28 to provide projections 29.

Figure 2:
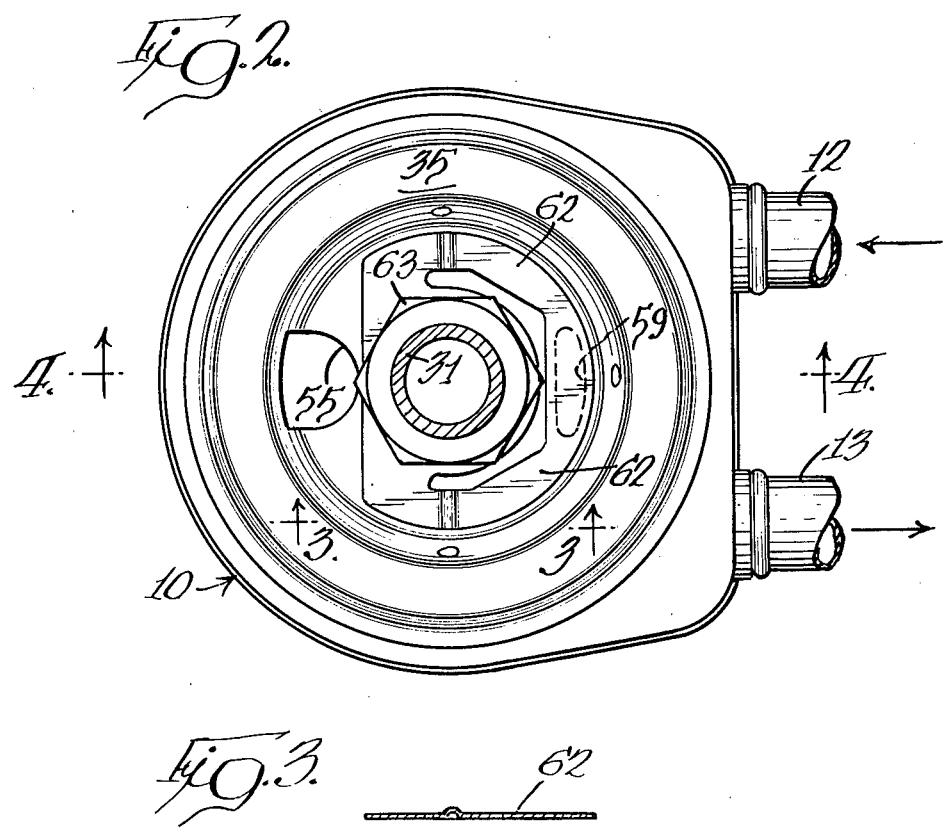
FIG. 2 is a sectional view taken substantially along line 2—2 of FIG. 4.

Projecting through a central opening 30 in each of the units 15 and surrounded by the second spacers 22 is a pipe 31 having its lower end connected to a threaded extension 32 on the engine block 11 and its upper end threaded as shown at 33 to provide a mounting for the filter 14. A filter of course is not necessary in the heat exchanger combination of this invention as the upper end 34 of the pipe 31 may be provided with a return cap, if desired, as illustrated in FIG. 2 of applicant's above prior patent.

The upper end of the heat exchanger 10 of this invention is defined by a sheet metal dome 35 that is shaped to provide an annular peripheral chamber 36. This chamber serves as a stabilizing mounting for the oil filter 14 which is, of course, provided with a gasket 37 of an O-ring type between the filter 14 and the dome 35. A gasket similar to the gasket 37 is provided on the bottom of the exchanger between a bottom gasket plate 38 and an adjacent surface 39 of the block 11 as illustrated by the O-ring type gasket 40.

In order to provide auxiliary spacers cooperating with the second spacers 22 to provide for the second or coolant fluid chambers 23 there are provided projecting distortions in each of the plates 16 and 17 that comprises these auxiliary spacers. These spacers 41 are in the shape of truncated cones and therefore have flat tops 42 that are adapted to be arranged in contact in the successive heat exchange units 15 as illustrated in FIGS. 4 and 6. In order to provide stability to the assembly of heat exchange units the end plates have their flat tops in similar contact with similar projections in a bottom header plate 43 in both embodiments and the end 44 of the casing or tank 21.

The bottom gasket plate 38 is of generally inverted dish-shape to provide a fluid distribution chamber 45 which in the illustrated embodiments is of course for distributing oil into the oil inlet manifold 25 that has an entrance 46 at the engine block end of the heat exchanger. This communication into the lower two plate unit 15 is through aligned openings in the gasket plate 38, the header plate 43 and the lower spacer 22.

The gasket plate 38 and thus the gasket 40 surrounds a passage 47 in the block 11 for flow of heated oil 48 from the engine sump into the heat exchanger 10. The engine block 11 is also provided with a passage 49 in the embodiment of FIG. 4 for the return of a portion of the cooled oil 52 to the engine sump in a manner to be described hereinafter. This passage 49 telescopically receives a tube 53 that is attached to the plate 38 at a circular flange portion 54 and as can be seen in FIG. 4 is located adjacent to one side of the gasket 40.

The upper end 44 of the tank 31 and the corresponding portion of the dome 35 is provided with an exit opening 55 from the heat exchanger and to the filter 14 when one is used. The oil after passage through the filter is then directed as indicated schematically by the arrows 56 into the top open end of the pipe 31 and from there back into the gallery of the engine block. Therefore, the opening 46 in the heat exchanger comprises the entrance opening to the flow path 26 and the top opening 55 comprises an exit opening from the heat exchanger oil outlet manifold 64.

The dome 35 is provided with a valve opening 57 that coincides with a similar opening 58 in the end 44 of the tank and the two comprising a bypass opening 59 that is aligned with the entrance 46 to the liquid inlet manifold 25. This bypass opening 59 is provided with an overlying leaf spring valve 62 that is held in place by an annular extension 63 on the oil return pipe 31. This spring valve 62 normally lies on top of the dome 35 to overlie the bypass opening 59 as shown in FIG. 2. This causes the oil flow 26 in the illustrated embodiments to flow into the manifold 25, laterally as indicated into the oil chambers 20 in the units 15 in parallel flow and then by way of a diametrically opposite oil outlet manifold 64 through the exit opening 55 and also through the auxiliary return passage 49.

However, when the viscosity of the liquid 48 is high, such as is the case with cold oil, the pressure of the cold oil is sufficient to displace upwardly the valve 62 to the open position of FIG. 5 thereby permitting the oil to pass directly from the heat exchanger as indicated by the arrows 65 and thus bypassing much of the volume of the oil chambers 20. In this instance there will, of course, be some oil that will pass through the oppositely located opening 55 but because of the direct alignment of the bypass opening 59 with the entrance 46 the amount of oil passing through the cooling chambers will be relatively small.

In the embodiment of FIG. 4 the auxiliary return of some of the cooled oil 52 through the return passage 49 permits an increased flow rate because of this return of the portion to the sump after cooling. The remainder of the oil is of course directed to the gallery as indicated at 56 after filtering with the filter 14. Then the pressure relief valve 62 at the opposite end of the unit or in the dome 35 is provided for bypassing the major portion of the heat exchanger when the oil is thick and congealed under the cold starting conditions.

Having described my invention as related to the embodiments shown in the accompanying drawings, it is my intention that the invention be not limited by any of the details of description, unless otherwise specified, but rather be construed broadly within its spirit and scope as set out in the appended claims.

I claim:

1. A heat exchanger for exchanging heat between two fluids, comprising:
    a plurality of heat exchange units each comprising a pair of plates joined permanently together at peripheral edges;
    first spacer means in each said unit between and joined to said pair of plates and inwardly of said edges defining with said edges a first fluid chamber in each said unit;
    a tank enclosing said plurality of units;
    means including second spacer means for arranging said units in spaced series in said tank to provide a second fluid chamber between each pair of said units and also for separating said first fluid chambers from said second fluid chambers;
    means for providing successive flow openings in said successive units in said series, said successive flow openings being defined by plate edges and said second spacer means comprises seal members located at and surrounding said edges;
    means for joining said first fluid chambers in a first fluid flow path including said openings;
    means for directing said first fluid into said tank and said first fluid flow path;
    means for directing said first fluid from said tank and said first fluid flow path through an exit opening;
    an oil pressure operated valve occupying a portion only of the exit opening, said valve being opened solely by cold oil first liquid to bypass automatically said oil first liquid flow path when cooling of said oil is unnecessary; and
    means for directing said second fluid through said tank between said successive units and thereby through said second chambers.

2. The heat exchanger of claim 1 wherein said second spacer means are also for separating said first flow chambers from said second flow chambers and wherein said plates are provided with separated projecting areas, the areas in adjacent units being in contact to comprise auxiliary spacer means in addition to said first spacer means and said second spacer means.

3. A heat exchanger for exchanging heat between two liquids, a first of which comprises a lubricating oil for an engine having an engine block and the second of which comprises a cooling liquid for said oil, comprising;
    a plurality of heat exchange units each comprising a pair of plates joined together at peripheral edges;
    first spacer means between and joined to each of said pair of plates and inwardly of said edges defining with said edges a first liquid chamber in each said unit;
    a tank enclosing said plurality of units;
    means including second spacer means for arranging said units in spaced series in said tank to provide a second liquid chamber between each adjacent pair of said units, said second spacer means separating said first flow chambers from said second flow chambers and comprising means defining said first flow path;

means for providing successive flow openings in said successive units in said series, said successive flow openings being defined by plate edges and said second spacer means comprises seal members located at and surrounding said edges;

means for joining said first liquid chambers in a first liquid flow path including said openings;

means for directing said first liquid from said block into said tank and said first liquid flow path;

means for directing said first liquid from said tank and said first liquid flow path through an exit opening back to said block;

an oil pressure operated valve occupying a portion only of the exit opening, said valve being opened solely by cold oil first liquid to bypass automatically said oil first liquid flow path when cooling of said oil is unnecessary; and means for directing said second liquid through said tank between said successive units and thereby through said second chambers.

4. A heat exchanger for exchanging heat between two liquids, a first of which comprises a lubricating oil for an engine having an engine block and the second of which comprises a cooling liquid for said oil, comprising: a plurality of heat exchange units each comprising a pair of plates joined permanently together at peripheral edges; first spacer means in each said unit between and joined to said pair of plates and inwardly of said edges defining with said edges a first liquid chamber in each said unit; a tank enclosing said plurality of units; means including second spacer means for arranging said units in spaced series in said tank to provide a second liquid chamber between each pair of said units and also for separating said first liquid chambers from said second liquid chambers; means for providing successive flow openings in said successive units in said series, said successive flow openings being defined by plate edges and said second spacer means comprises seal members located at and surrounding said edges, means for joining said first liquid chambers in a first liquid flow path including said openings; means for directing said first liquid into said tank and said first liquid flow path; means for directing said first liquid from said tank and said first liquid flow path through an exit opening; means for directing said second liquid through said tank between said successive units and thereby through said second chambers; and an oil pressure operated valve occupying a portion only of said oil path exit opening, said valve being opened solely by cold oil first liquid to bypass automatically said oil first liquid flow path when cooling of said oil is unnecessary.

* * * * *